United States Patent
Roux et al.

(10) Patent No.: US 9,779,079 B2
(45) Date of Patent: Oct. 3, 2017

(54) AUTHORING SYSTEM

(75) Inventors: Claude Roux, Grenoble (FR);
Jean-Yves Vion-Dury, Bivlers (FR)

(73) Assignee: XEROX CORPORATION, Norwalk, CT (US)

( * ) Notice: Subject to any disclaimer, the term of this patent is extended or adjusted under 35 U.S.C. 154(b) by 1630 days.

(21) Appl. No.: 11/756,756

(22) Filed: Jun. 1, 2007

(65) Prior Publication Data

US 2008/0300862 A1   Dec. 4, 2008

(51) Int. Cl.
*G06F 17/27* (2006.01)
*G06F 17/28* (2006.01)

(52) U.S. Cl.
CPC ........ *G06F 17/271* (2013.01); *G06F 17/2881* (2013.01); *G06F 17/2785* (2013.01); *G06F 17/289* (2013.01); *G06F 17/2836* (2013.01); *G06F 17/2872* (2013.01)

(58) Field of Classification Search
CPC ... G06F 17/271; G06F 17/2715; G06F 17/274
USPC .................................. 704/9, E15.001, 4, 3, 2
See application file for complete search history.

(56) References Cited

U.S. PATENT DOCUMENTS

| | | | |
|---|---|---|---|
| 5,227,971 A * | 7/1993 | Nakajima et al. | 704/2 |
| 5,477,451 A | 12/1995 | Brown et al. | |
| 5,638,543 A * | 6/1997 | Pedersen et al. | 704/1 |
| 6,092,034 A * | 7/2000 | McCarley et al. | 704/2 |
| 6,275,789 B1 * | 8/2001 | Moser et al. | 704/7 |
| 6,285,978 B1 * | 9/2001 | Bernth et al. | 704/7 |
| 6,304,841 B1 | 10/2001 | Berger et al. | |
| 6,374,224 B1 * | 4/2002 | Horiguchi et al. | 704/266 |
| 6,473,729 B1 * | 10/2002 | Gastaldo et al. | 704/4 |
| 6,721,697 B1 * | 4/2004 | Duan | G06F 17/277 704/2 |
| 7,058,567 B2 * | 6/2006 | Ait-Mokhtar et al. | 704/9 |
| 7,212,964 B1 * | 5/2007 | Alshawi et | 704/10 |
| 7,752,033 B2 * | 7/2010 | Uchimoto et al. | 704/9 |
| 8,131,555 B1 * | 3/2012 | Carriere | G06F 17/30873 704/246 |
| 2002/0026306 A1 * | 2/2002 | Bangalore et al. | 704/9 |
| 2002/0040292 A1 * | 4/2002 | Marcu | 704/4 |
| 2002/0040359 A1 * | 4/2002 | Green et al. | 707/3 |
| 2002/0087301 A1 * | 7/2002 | Jones et al. | 704/2 |
| 2002/0111941 A1 * | 8/2002 | Roux et al. | 707/3 |
| 2003/0018469 A1 * | 1/2003 | Humphreys | G06F 17/2881 704/9 |
| 2003/0182102 A1 * | 9/2003 | Corston-Oliver et al. | 704/9 |
| 2004/0024581 A1 * | 2/2004 | Koehn et al. | 704/2 |

(Continued)

OTHER PUBLICATIONS

U.S. Appl. No. 11/341,788, filed Jan. 27, 2006, Segond, et al.

(Continued)

*Primary Examiner* — Richemond Dorvil
*Assistant Examiner* — Mark Villena
(74) *Attorney, Agent, or Firm* — Fay Sharpe LLP

(57) ABSTRACT

A method for supervising text includes receiving input text in a natural language, the input text including at least one source sentence. The input text is analyzed, which includes, for a source sentence in the input text, generating a syntacetic representation. A target sentence is generated in the same natural language, based on the syntacetic representation. The source sentence is compared with the target sentence to determine whether there is a match. A decision is output, based on the comparison.

25 Claims, 4 Drawing Sheets

(56) References Cited

U.S. PATENT DOCUMENTS

| | | | |
|---|---|---|---|
| 2004/0030551 A1 | 2/2004 | Marcu et al. | |
| 2004/0034520 A1* | 2/2004 | Langkilde-Geary et al. | 704/1 |
| 2004/0102957 A1* | 5/2004 | Levin | 704/3 |
| 2004/0172235 A1* | 9/2004 | Pinkham et al. | 704/2 |
| 2004/0205737 A1* | 10/2004 | Margaliot et al. | 717/143 |
| 2005/0108630 A1* | 5/2005 | Wasson et al. | 715/513 |
| 2005/0125215 A1* | 6/2005 | Wu et al. | 704/1 |
| 2005/0138556 A1* | 6/2005 | Brun et al. | 715/536 |
| 2005/0171759 A1* | 8/2005 | Uchimoto et al. | 704/9 |
| 2005/0289168 A1* | 12/2005 | Green et al. | 707/101 |
| 2006/0009961 A1* | 1/2006 | Chan | 704/4 |
| 2006/0095248 A1* | 5/2006 | Menezes et al. | 704/3 |
| 2006/0116865 A1* | 6/2006 | Cheng et al. | 704/2 |
| 2006/0136196 A1* | 6/2006 | Brun et al. | 704/8 |
| 2006/0136223 A1* | 6/2006 | Brun et al. | 704/277 |
| 2006/0136352 A1* | 6/2006 | Brun et al. | 707/1 |
| 2006/0149633 A1* | 7/2006 | Voisin | G06Q 30/02 705/14.66 |
| 2006/0217963 A1* | 9/2006 | Masuichi et al. | 704/7 |
| 2006/0224378 A1* | 10/2006 | Chino et al. | 704/2 |
| 2006/0293876 A1* | 12/2006 | Kamatani et al. | 704/2 |
| 2007/0033002 A1 | 2/2007 | Dymetman et al. | |
| 2007/0050413 A1* | 3/2007 | Kominek | G06F 17/30899 |
| 2007/0083359 A1* | 4/2007 | Bender | 704/9 |
| 2007/0129935 A1* | 6/2007 | Uchimoto et al. | 704/9 |
| 2007/0179776 A1* | 8/2007 | Segond et al. | 704/9 |
| 2007/0244693 A1* | 10/2007 | Atallah et al. | 704/9 |
| 2008/0091408 A1* | 4/2008 | Roulland et al. | 704/9 |
| 2008/0208565 A1* | 8/2008 | Bisegna | 704/4 |
| 2008/0221870 A1* | 9/2008 | Attardi et al. | 704/9 |
| 2008/0270119 A1* | 10/2008 | Suzuki | 704/9 |
| 2010/0274552 A1* | 10/2010 | Gao et al. | 704/2 |

OTHER PUBLICATIONS

U.S. Appl. No. 11/378,708, filed Mar. 17, 2006, Roux, et al.

S.Ait-Mokhtar, J.P.Chanod, Incremental Finite-State Parsing, *Proceedings of Applied Natural Language Processing*, Washington, Apr. 1997.

S.Ait-Mokhtar, J.P.Chanod, Subject and Object Dependency Extraction Using Finite-State Transducers, *Proceedings ACL'97 Workshop on Information Extraction and the Building of Lexical Semantic Resources for NLP Applications*, Madrid, Jul. 1997.

J.Chen, S.Bangalore, O.Rambow, M.A.Walker, *Towards Automatic Generation of Nautural Language Generation Systems*, 2001.

O.Rambow, S.Bangalore, M.Walker (2000), Natural Language Generation in Dialog Systems, *Proceedings of the First International Conference on Human*.

E.Reiter, R.Dale (1997), Building Applied Natural Language Generation Systems, *Natural Language Engineering*, pp. 57-87, Cambridge University Press.

A.Knott, N.Wright (2003), A Dialogue-Based Knowledge Authoring System for Text Generation, *Natural Language Generation in Spoken and Written Dialogue*.

B.Lavoie, O.Rambow (1997), A Fast and Portable Realizer for Text Generation Systems, *Proceedings of the Fifth Conference on Applied Natural*.

J.Preiss (2002), Choosing a Parser for Anaphora Resolution, *Proceedings of DAARC*.

B.Vauquois, C.Boitet (1985), Automated Translation at Grenoble University, *Computational Linguistics*.

J.A.Batemen (1997), Basic Technology for Multilingual Theory and Practise: The KPML Development Environment, *Natural Language Engineering, Cambridge University Press*.

S.Ait-Mokhtar, J.P. Chanod, C.Roux (2002). Robustness Beyond Shallowness: Incremental Deep Parsing, *Natural Language Engineering*.

D.Dervisevic, H.Steensland (2005), Controlled Languages in Software User Documentation, *Master Thesis*, LITH-IDA-EX—05/070—SE, Sep. 23, 2005.

* cited by examiner

| | | |
|---|---|---|
| the | → | Determiner, definite |
| lady | → | Noun, feminine, singular |
| drinks | → | Noun, plural |
| | | Verb, singular, present, 3rd |
| a | → | Determiner, indefinite |
| glass | → | Noun, singular |
| of | → | Preposition |
| water | → | Noun, singular |
| | | Verb, infinite |

*FIG. 3*

```
SUBJ-PRE_PRESENT (drink, lady)     →   [lady drink)
OBJ-POST_PRESENT (drink, glass)    →   [lady [drink glass of water]]
DET (glass, a); DET (lady, the)    →   [the lady] drink [a glass] of water]
                                   →   [the [lady drinks] a glass of water]
```

*FIG. 4*

```
subject(service, ladies)        →   ladies service (since ladies
                                    is a plural form)
object(service, show)           →   ladies service sound
adverb post(service, lively)    →   ladies service lively sound
```

*FIG. 5*

AUTHORING SYSTEM

CROSS REFERENCE TO RELATED PATENTS AND APPLICATIONS

The following copending applications, the disclosures of which are incorporated herein in their entireties by reference, are mentioned:

U.S. application Ser. No. 11/378,708 (20051130-US-NP) filed Mar. 17, 2006, entitled SYNTACTIC RULE DEVELOPMENT GRAPHICAL USER INTERFACE, by Claude Roux, et al.; and U.S. application Ser. No. 11/341,788, filed Jan. 27, 2006, entitled LINGUISTIC USER INTERFACE, by Frederique Segond, et al.

BACKGROUND

The exemplary embodiment relates to the field of text processing. It finds particular application in connection with a text authoring system which supervises the authoring of text for applications such as statistical machine translation systems.

There are many applications where it is desirable to employ machine translation systems for translating text from a source language to a target language, such as in the preparation of manuals, text books, and the like. Because machine translation systems are prone to error, which generally increases as the complexity of sentence structure and language increases, authoring systems have been developed to supervise the writing of text by authors, which is to be subsequently translated.

Authoring systems generally employ a computer program which evaluates the text according to specific criteria. For example, the authoring system often only accepts words from a predefined vocabulary. Additionally, the sentences that are accepted by the authoring system typically have a limited number of sub-clauses. This is because, for a machine translation system to work effectively, it needs to be able to recognize the antecedent. The antecedent in a sentence is the word to which a specific pronoun refers. For example, in the sentence: "the friend of my daughter, who is nice," "who" may refer to "daughter" or "friend." Depending on which is correct, the adjective "nice" would be translated as the masculine form "gentil," or feminine form "gentile," in French.

Commonly, the authoring system uses surface elements, such as the frequency of the word "which" or the number of commas, to provide an estimate of the sentence complexity. Alternatively or additionally, the authoring system may place a limit on the number of words, on average, per sentence of a block of text. The authoring system automatically checks the compliance of a user's text with its internal rules and rejects any non-compliant sentences.

For example, the authoring system may permit a maximum of one subordinated clause in a sentence, specify an average sentence length of 13-17 words (if the text consists of at least four sentences), and specify that all sentences should contain no more than 20 words. Text which passes these stringent rules can be quite hard to read, in part, because it lacks interest for the reader.

For accurate translations, it would be helpful to provide the translation system with information on the syntax, such as whether a noun is a subject or object of a sentence and syntacetic dependencies, such as whether a noun in a sentence is the subject or object of a given verb. Syntacetic parsers have been developed which are able to provide this type of information. However, when a sentence exceeds a certain level of complexity, the parsing is more prone to errors. For example, most parsers are able to extract the subject of a sentence with an accuracy of at best, about 90%. Although good, this is still too low to be used in a system where the smallest error may have disastrous consequences. For example, if an authoring system is used as an input to an automatic translation system, the smallest error might end up in a faulty translation for many sentences. If the quality of the output of a syntacetic parser could be assured, the quality of texts may also be improved, as more complex and richer sentences could be written by the author.

INCORPORATION BY REFERENCE

The following references, the disclosures of which are incorporated herein in their entireties by reference, are mentioned:

U.S. Pat. No. 7,058,567, issued Jun. 6, 2006, entitled NATURAL LANGUAGE PARSER, by Aït-Mokhtar, et al., discloses a parser for syntactically analyzing an input string of text. The parser applies a plurality of rules which describe syntacetic properties of the language of the input string.

U.S. Published Application No. 20070033002, published Feb. 8, 2007, entitled SECOND LANGUAGE WRITING ADVISOR, by Dymetman, et al., discloses a writing advisor program which receives a proposed text in an author's second language and determines at least one candidate replacement word for a selected word based on a determined language model and a determined corruption model. The determined language model reflects correct usage of the text in the second language, independent of the native or first language of the author, based on the second language corpora. The determined corruption model is based on some a priori knowledge about probable corruption paths leading the author to realize some inadequate expressions in the second language instead of the correct, intended expression.

U.S. Pat. No. 5,477,451 entitled METHOD AND SYSTEM FOR NATURAL LANGUAGE TRANSLATION, by Brown, et al., U.S. Pat. No. 6,304,841 entitled AUTOMATIC CONSTRUCTION OF CONDITIONAL EXPONENTIAL MODELS FROM ELEMENTARY FEATURES, by Berger, et al., U.S. Published Application No. 20040024581 entitled STATISTICAL MACHINE TRANSLATION, by Koehn, et al., and U.S. Published Application No. 20040030551 entitled PHRASE TO PHRASE JOINT PROBABILITY MODEL FOR STATISTICAL MACHINE TRANSLATION, by Marcu, et al., describe statistical machine translation methods and systems for natural language translation.

BRIEF DESCRIPTION

In accordance with one aspect of the exemplary embodiment, a method for supervising text includes receiving input text in a natural language, the input text including at least one source sentence. The input text is analyzed including, for a source sentence in the input text, generating a syntacetic representation. A target sentence is generated in the same natural language, based on the syntacetic representation. The source sentence is compared with the target sentence to determine whether there is a match. A decision is output based on the comparison.

In another aspect, an authoring system includes a syntacetic analyzer which is configured for analyzing a source sentence of a natural language input text and generating a syntacetic representation of the source sentence. A text generator is configured for generating a target sentence in the natural language based on the syntacetic representation. A comparator is configured for comparing the source sentence with the target sentence to determine whether there is a match and outputting a decision based on the comparison.

In another aspect, a style checker is provided which reviews input text to determine whether it meets criteria for translation. The style checker rejects a source sentence of the input text where the source sentence does not match a target sentence which has been generated by syntactically analyzing the source sentences and regenerating a sentence based on the syntacetic analysis.

BRIEF DESCRIPTION OF THE DRAWINGS

FIG. 3 illustrates morphological analysis of a sentence.

FIG. 4 illustrates reconstruction of a sentence.

FIG. 5 illustrates reconstruction of another sentence.

DETAILED DESCRIPTION

Aspects of the exemplary embodiment relate to an automatic authoring system for supervising text and to a method for processing text. The exemplary authoring system may be used in conjunction with a machine translation system. In particular, the authoring system checks the suitability of text for translation by a statistical machine translation system. The authoring system identifies sentences which can be syntactically analyzed by the authoring system as candidates for translation, while advising the author regarding those sentences which cannot. The authoring system can assist in the provision of high quality translations that approximate those which a human being could provide. By controlling the language accepted, a translation is provided which may require little or no correction by a human translator. The use of an automatic evaluation method as described herein should prove invaluable for translation systems in order to improve both the style and the speed of translation.

While the authoring system is described with particular reference to its use in combination with a translation system, it is to be appreciated that the authoring system may find other applications, such as in the generation of text for use by people for whom it is not in their native language, for creation of children's books, for generation of on-line resources, such as manuals, which are to be automatically indexed according to their content, and the like.

In one aspect, the input text is syntactically analyzed to generate a complex syntacetic representation of each source sentence. A generation grammar is fed with this syntacetic representation and the sentence is regenerated as a target sentence. If the two sentences are identical, then it can be assumed that the syntacetic analysis was correct, otherwise the user may be requested to modify the faulty sentences, which have proven too complex for analysis.

An advantage of aspects of the exemplary embodiment is that the authoring system enables the user to write richer sentences, while ensuring that the system is able to cope with these sentences. Another advantage of certain aspects is that the authoring system does not need to rely on superficial techniques for assessing the complexity of a sentence, such as the number of words or sub-clauses which it contains. However, it is contemplated that such techniques may optionally be employed, e.g., in a less restrictive manner.

Figure 1:
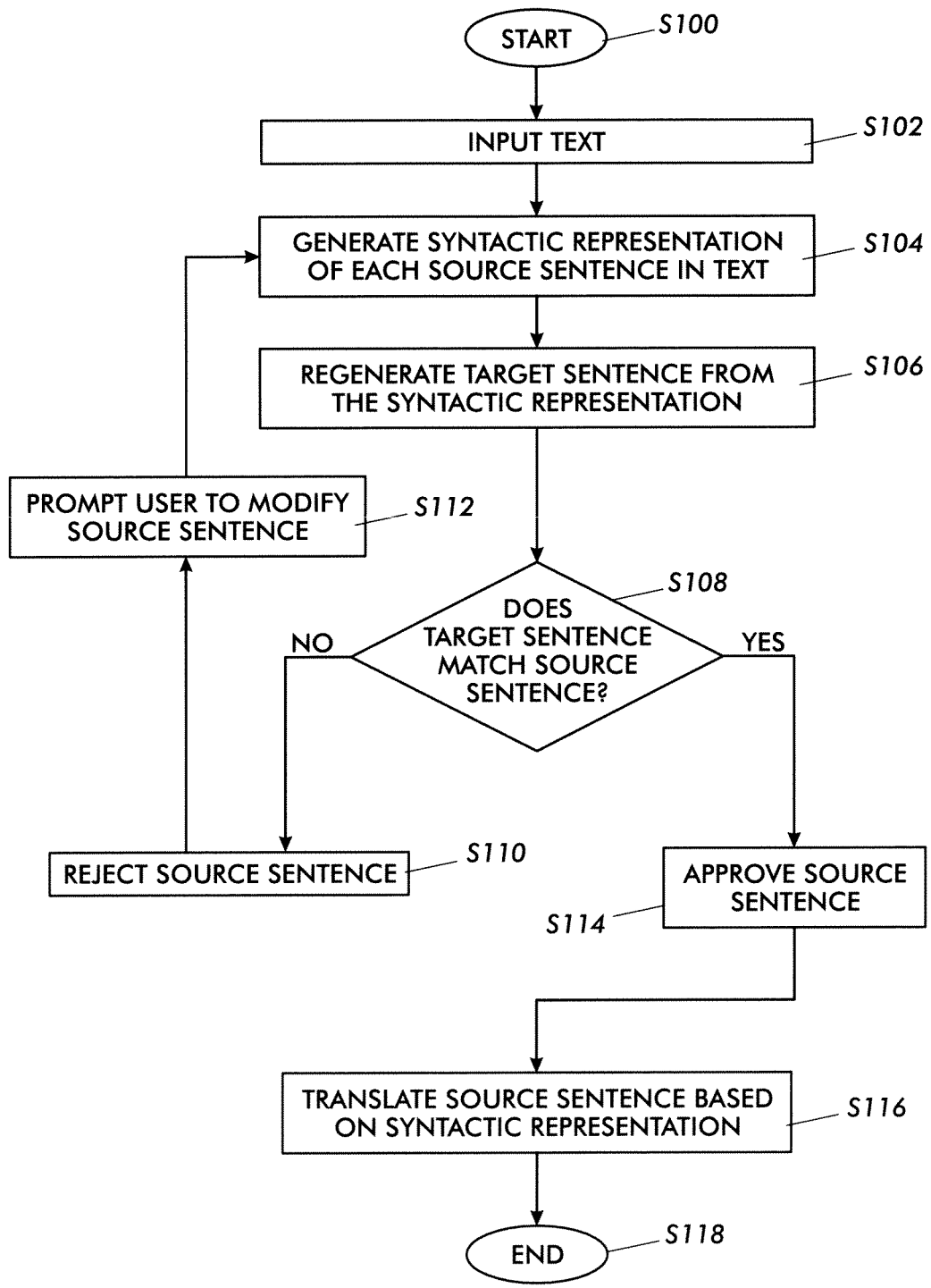
FIG. 1 is a functional block diagram of an environment in which an authoring system operates in accordance with a first aspect of the exemplary embodiment.
Figure 2:
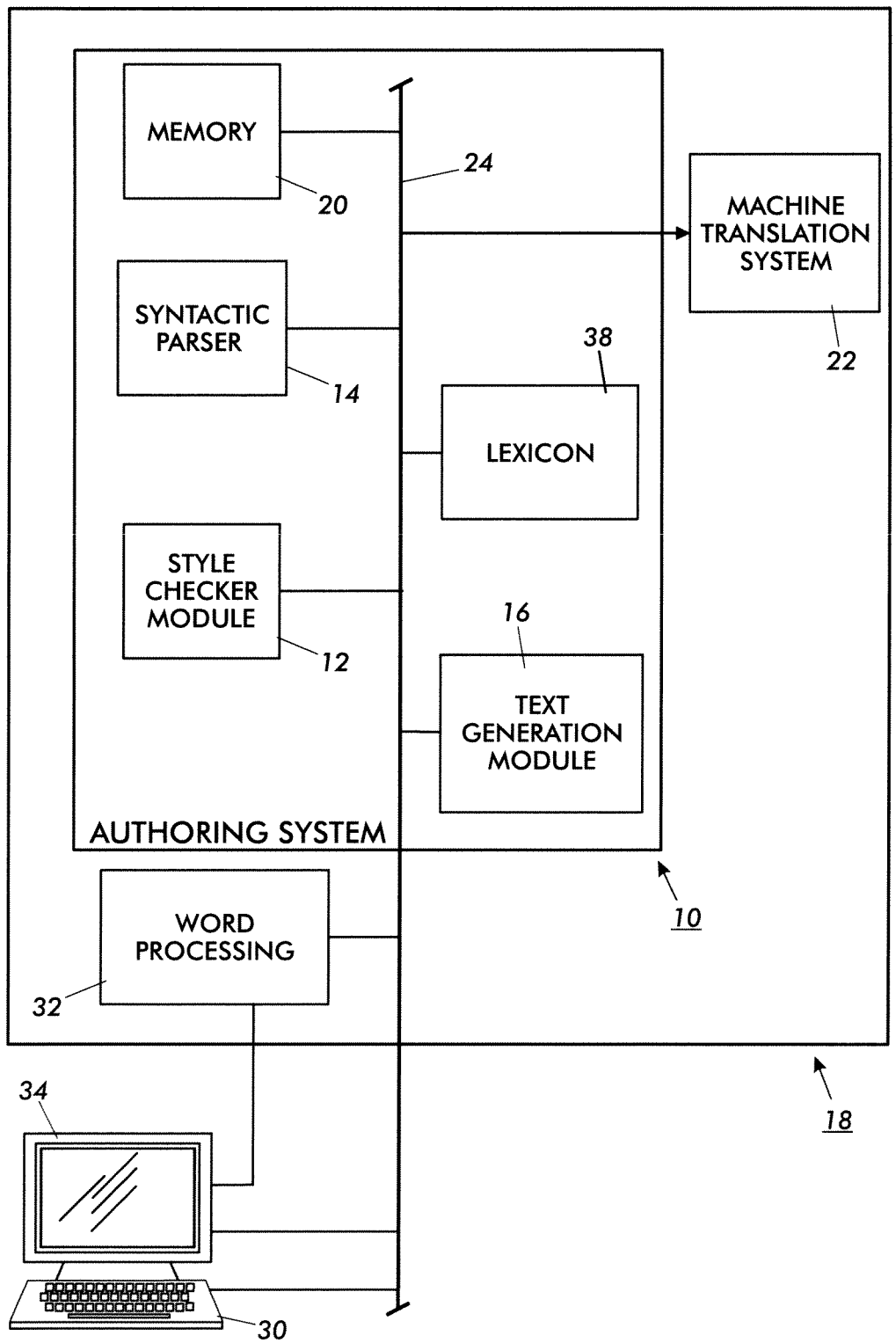
FIG. 2 illustrates a method for processing text in accordance with another aspect of the exemplary embodiment.

With reference to FIG. 1, an exemplary method for supervising text, which may be performed with an authoring system 10 as illustrated in FIG. 2, is shown. The method may include, fewer, more, or different steps, and the steps need not proceed in the order illustrated. The method begins at S100.

At S102, a block of text comprising one or more source sentences in a natural language is input, e.g., by an author, to an authoring system.

At S104, the text is analyzed. In particular, for at least some of the sentences identified in the input text, a syntacetic representation of the sentence is generated by parsing the sentence.

At S106, the syntacetic representation generated at S104 is used to regenerate a sentence by applying a generative grammar to the syntacetic representation. The regenerated (target) sentence is in the same natural language as the source sentence.

At S108 the target sentence is compared with the corresponding source sentence. The comparison is used as the basis of a decision.

If at S108, the regenerated sentence does not match the input sentence, it may be flagged as noncompliant or otherwise identified at S110, Sentences which cannot be analyzed because they include words which are not recognized may also be identified as non compliant.

At S112, a user may be given an opportunity to modify the noncompliant sentence, e.g., by reducing its complexity. Steps S102-S108 and optionally S110 may be repeated with the revised text. For example, the regenerated sentence may displayed, optionally highlighting the words which do not match, to provide the user with an indication of where the parsing failed to correctly analyze the sentence and thus hopefully assist the user in designing a compliant sentence or multiple sentences to replace the noncompliant one.

If at S108, the regenerated sentence matches the source sentence, e.g., has the same surface form as the source sentence, it may be flagged or otherwise identified as compliant at S114. Its associated syntacetic representation may be retained.

Optionally, at step S116, sentences or blocks of text which are determined to be compliant may be translated into a second language, using the syntacetic representation to assist in the translation. Or, the verified text may be stored or used for other purposes.

The method ends at S118.

With reference to FIG. 2, an authoring system 10, which may be utilized in performing the method of FIG. 1, is shown. System 10 includes a style checker module 12 which serves as a text comparator, a syntacetic analyzer or "parser" 14, and a text generator 16. Briefly, an input block of text, comprising one or more sentences in a natural language, is input to the parser 14. The parser processes each sentence in the text to provide a structured output in which syntacetic relationships between words in the sentence are identified. The text generator 16 regenerates each sentence, in the same natural language as the input text, based on the structured output of the parser 14. The style checker module 12 compares the regenerated sentence with the input sentence. A decision based on the comparison may be output by the comparator. For example, the sentence may be tagged as being incompatible/compatible with the system, based on the comparison. Any discrepancies between the input sentence and the output sentence may be considered as an indication that the parser is unable to cope with the sentence.

The authoring system 10 may be hosted by a computing device 18, such as a general purpose computer, e.g., a desktop computer, laptop computer, or personal digital assistant, or in a dedicated computing device, such as a portable translation tool. The authoring system 10 may comprise a single processing unit, or be distributed across one or more processing units in one or more locations, e.g., on a client and server. The components 12, 14, 16 of the authoring system may thus reside in the same location. Alternatively, the components may be in different locations and communicate via suitable links, such as wired or wireless connections, e.g., via a network such as a local area network or the internet. The components 12, 14, 16 may be embodied in hardware, software, or a combination thereof.

In one embodiment, the components 12, 14, 16 are software components which execute instructions stored in associated memory 20 for performing the method described in with reference to FIG. 1. Memory 20 may also store natural language text and analyzed text during processing. Memory 20 may comprise any known type of data storage and/or transmission media, including magnetic media, optical media, random access memory (RAM), read-only memory (ROM), a data cache, a data object, etc. Moreover, memory 20 may reside at a single physical location, comprising one or more types of data storage, or be distributed across a plurality of physical systems in various forms.

The computer 18 may also host a statistical machine translation system 22, which provides a translation of the text block, after it has been approved by the style checker 12. In other embodiments, the translation module may be hosted by another device remote from the authoring system. The various components of the computer may be connected by a data/control bus 24.

The author of the text, or other operator, employs a user input device 30, such as a keyboard, and a computer word processing program or system 32, which may be resident in the computer 18, to author or otherwise input a block of text in a natural language, such as English or French. The input text may be displayed on an appropriate visual display, such as a monitor 34. The text is input to the authoring system 10 and may be stored in memory 20.

Further details of the exemplary system and method will now be described.

As noted above, the syntacetic parser 14 processes the input text with the aim of providing a syntacetic representation for each sentence. In particular, the parser first breaks the text down by identifying the sentences in the text, and tokenizes each sentence to provide an ordered sequence of tokens, each token generally comprising a single word. Punctuation is also recognized.

Once the text sentence has been transformed into a sequence of tokens, the next step is to evaluate the lexical nature of each of these tokens. For instance, water is both a noun and a verb (as in to water the plant). Since, at this stage, the parser does not know anything about the role of each word in the sentence, the parser (or more specifically a lemmatizer, or morphological analysis component of the parser) assigns to each token a series of categories (parts of speech) and features (form of the part of speech, such as tense in the case of a verb, singular or plural in the case of a noun).

For example, given the sentence:
The lady drinks a cup of tea.
the lemmatizer may identify the categories and features shown in FIG. 3.

The morphological analysis may be performed with a finite-state lexicon 38. A finite-state lexicon is an automaton which takes as input a token and yields the possible interpretations of that token. A finite-state lexicon stores thousands of tokens together with their word forms in a very compact and efficient way.

Any word which is not found in the lexicon 38, i.e., is not recognized by the authoring system 10, may be rejected as non-compliant, resulting in the entire sentence being flagged as noncompliant.

Where there is ambiguity, the parser 14 may apply disambiguation rules to remove the non relevant categories. For example, the word water has been analyzed by the lemmatizer as being both a verb and noun. Since, only one category is permitted for a given analysis, one of these analyses is removed. In the case of water, in the previous example, the correct word form is noun, the verb category should then be eliminated. Disambiguation may be performed using a statistical method, such as using a Hidden Markov Model (HMM), which has been trained on large corpora, or by applying rules written by a grammarian, or a combination of both.

Words are first organized into phrases or chunks in which one or more words are grouped around a head. The heads are typically nouns, pronouns, or verbs. In the exemplary sentence, the chunks "the lady", "a glass," "of water" and "drinks" may be identified. The parser 14 then identifies syntacetic relationships ("dependencies") between pairs of words, particularly between words which form the heads of these chunks, in this case: "lady", "drinks", and "water". Dependencies may also be built between words of the same chunk such as: determiner(the, lady). Each syntacetic relationship identifies a link between words within the same sentence. Thus, whenever two or more words are identified in a sentence, an attempt is made to build a set of syntacetic relationships. The parser 14 applies a set of rules for determining the dependencies between words. Exemplary dependencies include subject relationships (SUBJ), which describe the relationship between a subject and its verb, for example, a noun which is the subject of a sentence and its associated verb, object relationships (OBJ), which describe the relationship between an object and its verb, for example, a noun which is the object of a sentence and its associated verb, adverbial relationships (ADV), and modifiers (MOD), which are words which modify another word, for example, an adjective which modifies a respective noun. Each of these dependencies may be described as PRE or POST. In the case of an adverbial relationship, for example, PRE denotes that the adverb appears before the verb, while POST indicates that the adverb appears after the verb. Other dependencies include determiner (DET), which is the relationship between an article and a noun, and prepositional relationships (PREPD).

For example, in the sentence above, the following list of dependencies may be output:

DET (the, lady)
DET (a, glass)
SUBJ-PRE (drink, lady)
OBJ-POST (drink, glass)
PREPD (water, of)

In the exemplary embodiment, the dependencies also bear specific features which record the verb tense. Thus, for example, a tag PRESENT is attached to dependencies in which the word "drink" occurs. Past and future tenses may be recorded with appropriate distinguishing feature tags. Further tags may be used to identify specify forms of these tenses, such as PAST_PLUPERFECT. Alternatively, a single tag may be used to represent the specific verb form. These features are used to control the form of the verb in the regenerated sentence.

Depending on the complexity of the parser 14, there may be many hundreds of rules which the parser applies in assigning a syntacetic dependency and many different types of dependencies. The output of the parser includes a list of pairs of words, each pair being linked to its respective syntacetic dependency. In the output, each verb may be reduced to its normalized (lemma) form. Thus, for example, the word "drinks" is reduced to the infinitive form, "drink." For languages with a richer morphology than English, such as French or Russian, where adjectives and determiners may assume multiple genders, such as masculine or feminine, the lemmatization may be extended to adjectives and determiners. In general, the noun is not lemmatized, i.e., the word ladies would not be reduced to the singular form lady.

The parser 14 may be an incremental parser, such as the Xerox Incremental Parser (XIP) as described, for example, in above-referenced U.S. patent application Ser. Nos. 11/378,708 and 11/341,788; U.S. Pat. No. 7,058,567; Aït-Mokhtar, et al., "Incremental Finite-State Parsing," Proceedings of Applied Natural Language Processing, Washington, April 1997; and Aït-Mokhtar, et al., "Subject and Object Dependency Extraction Using Finite-State Transducers," Proceedings ACL'97 Workshop on Information Extraction and the Building of Lexical Semantic Resources for NLP Applications, Madrid, July 1997.

As will be appreciated, the parser 14 may apply a much more complex analysis than is described here. For example, parsing may include named entity extraction (people, places etc.), identification of anaphoric and cataphoric links, and the like. The parsing may also provide an identification of chunks of related words, such as noun phrases, prepositional phrases, and verb phrases. In some cases, chunks may be subsumed into larger ones. The parsing output may be refined through multiple iterations or loops.

At each step in the process, including tokenization, lemmatization, and determination of syntacetic dependencies, the application of the parser rules may result in errors such that one or more of the assigned dependencies differ from those which the author or a trained human grammarian would apply. The errors lead to inaccuracies in the parser output for some of the sentences. This is because parsing, even with the most efficient syntactic parsers available, is still very difficult and the error rate radically increases with the sentence complexity.

The text generator 16 takes as input the output of the parser 14 and derives a regenerated sentence therefrom. If the parser has correctly identified the dependencies, the regenerated sentence should exactly match the input sentence. The exemplary text generator applies a simplified set of rules in generating a sentence. In the exemplary embodiment, the text generator takes as input the syntacetic dependency representation and regenerates the output without modifying this syntacetic input as a machine translation system would. The syntacetic input thus remains intact. A generation grammar (the rules applied by the text generator), in the exemplary system, does not try to split any syntacetic representation into an unknown number of sentences. Rather, each syntacetic representation is reconfigured as a single sentence. However, it does try to solve the different verb and noun agreements. Thus, for example, given the correct subject dependency between lady and drink for the exemplary sentence, the text generator 16 will output drinks.

The dependencies may be analyzed in a specific order. For example, a subject pattern may first be generated, then an object pattern, and finally a determiner pattern. A last step may include regenerating the correct surface form. Thus for example, in the case of the exemplary sentence, The lady drinks a glass of water, the regeneration may proceed as shown in FIG. 4.

SUBJ-PRE_PRESENT (drink, lady) → [lady drink]
OBJ-POST_PRESENT (drink, glass) → [lady [drink glass of water]]
DET (glass, a); DET (lady, the) → [the lady] drink [a glass] of water]
→ [the [lady drinks] a glass of water]

In the exemplary embodiment, each verb is lemmatized (it appears as an infinitive verb in the dependencies), in order to use the agreement between the noun and the verb as a verification mechanism. In this example, the text generator regenerates the correct surface form, due to the subject dependency. Any error in the final verb agreement is a very good indication of an initial parsing error. For languages with a richer morphology than English, such as French or Russian, the lemmatization may be extended to adjectives and determiners that may also vary dramatically when the parsing analysis is wrong.

The text generator 16 understands the meta-data or other tags used to separately identify each of the syntacetic dependencies in the representation. However, the text generator relies on a relatively limited set of rules for regenerating a sentence based on these tags. As will be appreciated, if the parser were used in a reverse manner to regenerate the sentence, it would be highly likely to arrive at the source sentence. However, by limiting the text generator to a reduced set of rules (and/or a somewhat different set of rules) any errors in the parsing are more likely to show up. Thus, for example, the text generator may apply a set of about 15 rules, depending on the language of the input text. For example, the rules may specify that the determiner goes before the associated noun fragment and provide rules for particular text fragment ordering which is unique to questions.

In some cases, the text generator 16 may generate a sentence which is not identical to the input sentence even when the parsing was correct. Ideally, the number of times this occurs is relatively limited, to avoid the user from revising sentences which may have been adequately translated without revision.

The machine translation system 22 takes as input the compliant text and translates it into a target language, different from the natural language in which the text is authored (such as French to English, or vice versa). Exemplary translation systems may employ conditional probability models. Each source sentence "e" in a parallel corpus may be assumed to "generate" a target sentence "f" by means of a stochastic process, whose parameters are estimated using traditional Expectation Maximum (EM) techniques. The model explains how source words are mapped into target words and how target words are re-ordered to yield well-formed target sentences. A variety of methods are used to account for the re-ordering of target words, including methods using word-based, template based, and syntax-based models. Although these models use different generative processes to explain how translated words are re-ordered in a target language, at the lexical level these models all assume that source words are individually translated into target words.

In the exemplary embodiment, the author may be limited to only those sentences that the system is able to process, i.e., compliant sentences. The exemplary authoring system 10 thus prevents a user from writing sentences that would otherwise fail the parser. In this embodiment, noncompliant sentences, or text blocks containing them, are blocked from being submitted to the translation system 22. The authoring system 10 may also be used to automatically detect grammatical errors. While the authoring system does not ensure that the translation is accurate, the reliance on parsing algorithms can provide a greater expectation that the translation of the text will be accurate and/or provide the user with greater flexibility in drafting sentences than with a conventional authoring system.

In other embodiments, the author may be free to submit non-compliant sentences for machine translation, with the understanding that a manual review of the translated sentence may be required.

The method illustrated in FIG. 1 may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 5, can be used to implement the method for processing text.

The exemplary method may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The following non-limiting examples demonstrate the use of an authoring system as described above.

Example 1

The following sentence is input to the authoring system:
In one recent ad, Telephone Premier calls a competitor to task by name, saying that its own mobile broadband service is five times as fast as Secondo's. This sentence is analyzed with the English Xerox Incremental Parser (XIP), and the following result is obtained:
Chunks:
0>TOP{PP{in NP{one AP{recent} ad}}, SC{NP{telephone Premier} FV{call}} NP{a competitor} IV{to task} PP{by NP{name}}, GV{say} SC{BG{that} NP{it AP{own} mobile AP{broadband} service} FV{be}} NP{five time} as fast as AP{Secondo's.}}
Dependencies:

DETD_(competitor,a)
DETD_(service,it)

-continued

QUANTD_(ad,one)
QUANTD_(time,five)
MAIN_(call)
PREPD_(task,to)
PREPD_(ad,in)
PREPD_(name,by)
MOD_PRE_(ad,recent)
MOD_PRE_(service,own)
MOD_PRE_(service,broadband)
MOD_PRE_(Premier,telephone)
MOD_PRE_(service,mobile)
MOD_POST_INFINIT_(competitor,task)
NUCL_SUBJCOMPL_(be,time)
SUBJ_PRE_(call,Premier)
SUBJ_PRE_(be,service)
OBJ_POST_(call,competitor)
MOD_POST_(be,as)
MOD_POST_(be,fast)
CONNECTOR_COMPLTHAT_(be,that)
MOD_POST_(time,Secondo's.)
OBJ_POST_SENTENCE_(say,that)
PREPD_(ad,in)
MOD_PREP_(task,name)
SUBJ_PRE_(say,Premier)
OBJ_(be,time)
CONNECTOR_SENTENCE_(service,that)

Alternatively or additionally, the dependencies may be identified with a tag which denotes a particular parser rule which created the dependency. The text generator 16 is fed with this syntacetic information to re-generate the sentence. Note that in the above example, the parser also identifies a dependency (the feature MAIN_(call)). which does not create a dependency between two words. Rather, this type of dependency links a word to a sentence.

Example 2

The following sentence is input to the authoring system:
Ladies services sound lively.
A syntacetic parser might erroneously consider services as a verb and sound as a noun. The analysis in that case would be:

Subject-present(service,ladies)
object_present(service,sound)
adverb_post(service, lively) lively is in post-position with service The system will then re-generate the sentence shown in FIG. 5, on the basis of the above data.

The final sentence is very different from the input sentence. The most common parsing mistakes, such as wrong part of speech assignment, or wrong dependency extraction will show up in the final result as they disrupt the logical generation of the sentence.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A method for supervising text comprising:
receiving input text in a natural language into memory of a computing device, the input text including at least one source sentence;

with an authoring system of the computing device, analyzing the input text including, for a source sentence in the input text, generating a syntactic representation;

generating a target sentence in the same natural language as the input text, based on the syntactic representation;

comparing the source sentence with the target sentence to determine whether there is a match, wherein the sentences are a match when each word and its position in the sentence is identical for the source and target sentences; and outputting a decision based on the comparison.

2. The method of claim 1, wherein the analyzing includes automatically identifying syntactic relationships between pairs of words in the source sentence, the syntactic representation including the identified syntactic relationships.

3. The method of claim 1, wherein the generating includes applying a grammar to the syntactic representation, the grammar comprising a plurality of rules which define how sentences are regenerated from syntactic representations.

4. The method of claim 3, wherein the analyzing the input text includes applying a set of rules to the source sentence and wherein rules of the grammar differ from the set of rules.

5. The method of claim 1, wherein in the representation, verbs are represented by their lemma forms.

6. The method of claim 5, wherein tenses of the verbs are identified in the representation.

7. The method of claim 1, wherein the decision includes rejecting a sentence for which the source sentence and target sentence do not match.

8. The method of claim 1, wherein the decision includes prompting a user to revise a sentence for which the source sentence and target sentence do not match.

9. The method of claim 1, wherein, where the source sentence and target sentence match for the at least one source sentence, approving the text for translation into a natural language which is different from that of the target and source sentences.

10. The method of claim 9, further comprising, translating the text into another natural language, based on the syntactic representation of each the source sentences.

11. The method of claim 1, further comprising, displaying a representation of the text which identifies sentences for which the source and target sentence do not match.

12. The method of claim 1, wherein the generation includes identifying any subject and object patterns, associating any determiners with the identified subject and object patterns, and conjugating any verbs based on their lemma forms and the syntactic representation.

13. The method of claim 1, further comprising:
accessing a lexicon and, for a source sentence which includes a word which is not present in the lexicon, the output decision includes rejecting the source sentence.

14. The method of claim 1, wherein the analyzing includes breaking a source sentence down into a sequence of tokens and for each token, assigning morphological information to the token, and generating the syntactic representation based on the assigned morphological information.

15. The method of claim 1, wherein the analyzing, generating, comparing, and outputting are all performed automatically.

16. The method of claim 1, wherein the generating of the target sentence in the same natural language as the input text, based on the syntactic representation comprises feeding the syntactic representation to a generation grammar which generates the target sentence in the same natural language as the input text.

17. A computer program product comprising a tangible computer-readable recording medium encoding instructions, which when executed on a computer causes the computer to perform a method comprising:

for input text in a natural language including at least one source sentence, analyzing the input text including the input text including, for a source sentence in the input text, generating a syntactic representation;

generating a target sentence in the natural language of the source sentence, based on the syntactic representation; and comparing the source sentence with the target sentence to determine whether there is a match; and outputting a decision based on the comparison.

18. An authoring system implemented in a computing device which performs the method of claim 1.

19. An authoring system comprising:
a syntactic analyzer which is configured for analyzing a source sentence of a natural language input text and generating a syntactic representation of the source sentence;

a text generator configured for generating a target sentence in the natural language of the source sentence, based on the syntactic representation of the source sentence; and a comparator configured for comparing the source sentence with the target sentence to determine whether there is a match and outputting a decision based on the comparison.

20. The authoring system of claim 19, further comprising a display for displaying the text and for identifying source sentences for which the source and target sentences do not match.

21. The authoring system of claim 19, further comprising a lexicon, the comparator being configured to reject a sentence which includes a word which is not in the lexicon.

22. The authoring system of claim 19, wherein the source sentence is determined to be a match of the target sentence only when each word and its position in the sentence is identical for the source and target sentences.

23. A system comprising memory which stores a style checker and a processing unit which implements the style checker, the style checker reviewing input text to determine whether it meets criteria for translation, the style checker rejecting a source sentence of the input text where the source sentence does not match a target sentence which has been generated by syntactically analyzing the source sentence and regenerating a sentence in the same language as the source sentence, based on the syntactic analysis.

24. In combination, a translation system and the style checker of claim 23, the translation system being configured for translating text, which has not been rejected by the style checker, into a language which is different from the language of the source and target sentences.

25. The style checker of claim 23, wherein the source sentence is a match of the target sentence only when each word and its position in the sentence is identical for the source and target sentences.

* * * * *